United States Patent
Abadi et al.

(10) Patent No.: US 10,331,651 B2
(45) Date of Patent: *Jun. 25, 2019

(54) UPDATING WEB FILES BASED ON DETECTED LEGACY MODEL FILE CHANGES

(71) Applicant: International Business Machines Corporation, Armonk, NY (US)

(72) Inventors: Moria Abadi, Petah-Tikva (IL); Yuval Gil, Lod (IL); David Hirsch, Jerusalem (IL); Alexander Rekhter, Ashdod (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,483

(22) Filed: Oct. 19, 2015

(65) Prior Publication Data

US 2016/0188650 A1    Jun. 30, 2016

Related U.S. Application Data

(63) Continuation of application No. 14/587,894, filed on Dec. 31, 2014.

(51) Int. Cl.
| | | |
|---|---|---|
| G06F 17/30 | (2006.01) | |
| G06F 16/23 | (2019.01) | |
| H04L 29/08 | (2006.01) | |
| G06F 16/84 | (2019.01) | |
| G06F 16/955 | (2019.01) | |
| G06F 16/17 | (2019.01) | |

(52) U.S. Cl.
CPC ...... *G06F 16/2322* (2019.01); *G06F 16/1734* (2019.01); *G06F 16/2358* (2019.01); *G06F 16/2365* (2019.01); *G06F 16/84* (2019.01); *G06F 16/955* (2019.01); *H04L 67/02* (2013.01); *H04L 67/2823* (2013.01)

(58) Field of Classification Search
None
See application file for complete search history.

(56) References Cited

U.S. PATENT DOCUMENTS 7,275,244 B1 *  9/2007  Charles Bell ....... G06F 17/3089
                                                      717/168
9,122,716 B1 *  9/2015  Naganathan ...... G06F 17/30545
(Continued)

OTHER PUBLICATIONS

List of IBM Patents or Patent Applictions Treated As Related; (Appendix P), Filed Oct. 19, 2015, 2 pages.
(Continued)

*Primary Examiner* — Alex Gofman
(74) *Attorney, Agent, or Firm* — Cantor Colburn LLP; Maeve Carpenter

(57) ABSTRACT

According to an aspect, a content fragment of a legacy model file is mapped via a processor to a plurality of web files. A change to the content fragment of the legacy model file is detected by the processor. One or more modified web files corresponding to the changed content fragment is generated by the processor. The one or more modified web files corresponding to the detected changes in the content fragment of the legacy model file are sent via the processor to a remote computing device.

5 Claims, 11 Drawing Sheets

(56) References Cited

U.S. PATENT DOCUMENTS

| | | | |
|---|---|---|---|
| 2005/0149911 A1* | 7/2005 | Nadon | G06F 8/20 |
| | | | 717/120 |
| 2006/0101058 A1* | 5/2006 | Chidlovskii | G06F 17/2247 |
| 2007/0239762 A1* | 10/2007 | Farahbod | G06F 8/35 |
| 2008/0222189 A1* | 9/2008 | Ovanesyan | G06Q 10/06 |
| 2011/0167409 A1* | 7/2011 | Schadow | G06F 8/20 |
| | | | 717/123 |
| 2012/0030179 A1* | 2/2012 | Kauffman | G06F 17/30091 |
| | | | 707/654 |

OTHER PUBLICATIONS

Moria Abadi et al., Pending U.S. Appl. No. 14/587,894 entitled "Updating Web Files Based on Detected Legacy Model File Changes," filed with the U.S. Patent and Tradmark Office on Dec. 31, 2014.

* cited by examiner

300

```
I-Logix-RPY-Archive Version 8.9.0 C++ 7155907
{ ISubsytem
    - _id = GUID b6685b74-c80b-4944-82eb-f138d27c6782;
    - _myState = 8192;
    - _name = "P1";
    ...
    - _lastID = 2;
    - Declaratives = { IRPYRawContainer
        - size = 2;
        - value =
        { ISubsytem
            - _id = GUID 0059bc1e-2d36-4236-99b1-4cae85447287;
            - _myState = 8192;
            - _name = "P2";
            ...
            - Classes = { IRPYRawContainer
                - size = 2;
                - value =
                { IClass
                    - _id = GUID c9d1a778-e7a0-45ee-91f9-35be224988d2;
                    - _myState = 40960;
                    - _name = "TopLevel";
                    ...
                }
                { IClass
                    - _id = GUID 7e23ff98-3901-4c44-b55d-db97c9c194dc;
                    - _myState = 8192;
                    - _name = "C1";
                    ...
                    - Operations = { IRPYRawContainer
                        - size = 1;
                        - value =
                        { IPrimitiveOperation
                            - _id = GUID 5d75aadc-a5e6-4a71-a43b-1622ec37d0f3;
                            - _myState = 8192;
                            - _name = "op1";
                            ...
                        {
                    }
                    - Attrs = { IRPYRawContainer
                        - size = 1;
                        - value =
                        { IAttribute
                            - _id = GUID 000760a9-0515-4bf6-95a7-52da3388bd23;
                            - _myState = 8192;
                            - _name = "attr1";
                            ...
                        }
                    }
                    - _Multiplicity = "";
                    - _itsStateChart = { IHandle
                        - _m2Class = "";
                    }
                    - _classModifier = Unspecified;
                }
            }
            - _configurationRelatedTime = 1.1.1970::2:0:0;
        }
        { ISubsytem
            - _id = GUID d54878f7-794f-48fd-8e86-eb3d19098513;
            - _myState = 8192;
            - _name = "P3";
            ...
        }
    }
}
```

402 — ISubsytem P1
404 — ISubsytem P2
406 — IClass C1
408 — IPrimitiveOperation op1
410 — IAttribute attr1
412 — ISubsytem P3

UPDATING WEB FILES BASED ON DETECTED LEGACY MODEL FILE CHANGES

DOMESTIC PRIORITY

This application is a continuation of U.S. patent application Ser. No. 14/587,894, filed Dec. 31, 2014, the content of which is incorporated by reference herein in its entirety.

BACKGROUND

The present disclosure relates to updating web files, and more specifically, but not exclusively, to updating web files based on legacy model file changes.

SUMMARY

According to an embodiment, a system can include a memory having computer readable instructions. The system can also include a processor for executable the computer readable instructions. The computer readable instructions can include mapping a content fragment of a legacy model file to one or more web files, detecting a change to the content fragment of the legacy model file, generating one or more modified web files corresponding to the changed content fragment, and sending the one or more web files to a server at a predetermined time or upon receiving a request.

According to another embodiment described herein, a method can include mapping, via a processor, a content fragment of a legacy model file to a plurality of web files. The method can also include detecting, via the processor, a change to the content fragment of the legacy model file. The method can also further include generating, via the processor, one or more modified web files corresponding to the changed content fragment. The method can also include sending, via the processor, the one or more modified web files corresponding to the detected changes in the content fragment of the legacy model file to a remote computing device.

According to another embodiment described herein, a computer program product for updating web files can include a computer-readable storage medium having program code embodied therewith, wherein the computer readable storage medium is not a transitory signal per se. The program code can be executable by a processor to cause the processor to map content fragments of a legacy model file to a plurality of web files, detect a change to a content fragment of the legacy model file, generate a modified web file corresponding to the changed content fragment, and send the modified web file to a server along with a timestamp or hash value associated with the web file at a predetermined time.

BRIEF DESCRIPTION OF THE DRAWINGS

FIG. 4 is a diagram of example legacy model file code for a model;

DETAILED DESCRIPTION

Modern desktop modeling tools include online storage features that can be used to keep models saved on servers. A model, as used herein, includes any system that is expressed according to a consistent set of rules defined by a modeling language. In some examples, the features can include a storage feature wherein files in a legacy model file format are updated to a server by comparing operating system timestamps.

Figure 3:
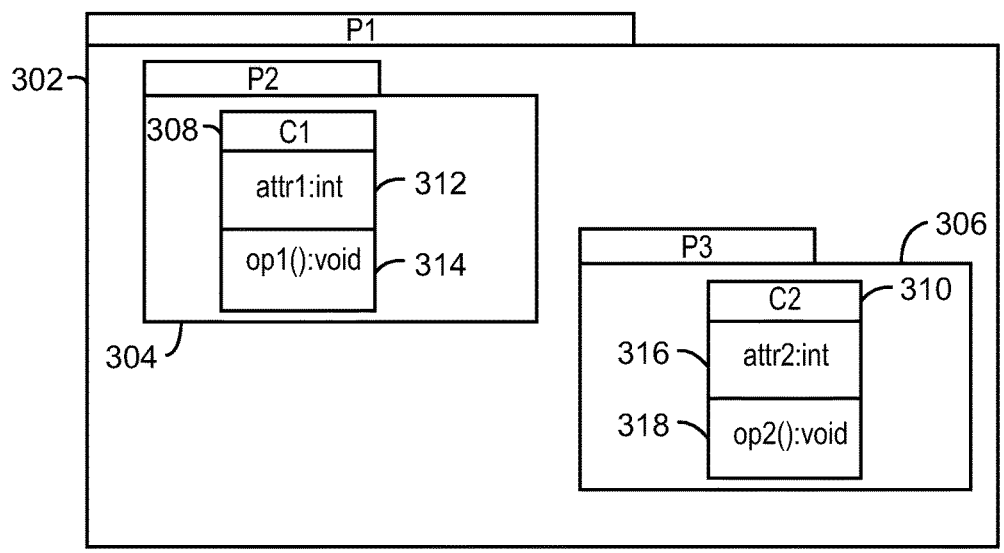
FIG. 3 is a diagram of content fragments in an example model.

According to embodiments, web files corresponding to model elements in legacy model files can be updated incrementally on a server. A web file, as used herein, is a model file in any standard web format such as HTML, RDF, among others stored in a separate computing device from a legacy model file. A legacy model file, as used herein, refers to any file format used by modeling tool software, exclusive of web file formats, that is stored locally on a client device. In some embodiments, a legacy model file can be divided into content fragments. The content fragments of the legacy model can then be mapped to one or more web files. A change to the content fragment of the legacy model file can be detected. One or more modified web files can then be generated corresponding to the changed content fragment. The one or more web files corresponding to the changed content fragment can then be sent to a server at a predetermined time. In some examples, the changes can be detected by comparing element timestamps or hash values. Thus, the web files can be updated incrementally based on the detected changes to legacy model files. Moreover, because the web files are updated if a content fragment has changed, bandwidth and server resources are saved by not uploading or otherwise modifying entire legacy model files or web files corresponding to entire legacy model files. The web files can be used to represent the model on the remote device, for example to show the model graphically as shown in FIG. 3, to see the values of the attributes, to read the implementation of the operations, and so on.

In some scenarios, the techniques described herein may be implemented in a cloud computing environment. As discussed in more detail below in reference to at least FIGS. 1, 5, and 6, a computing device configured to update web files may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
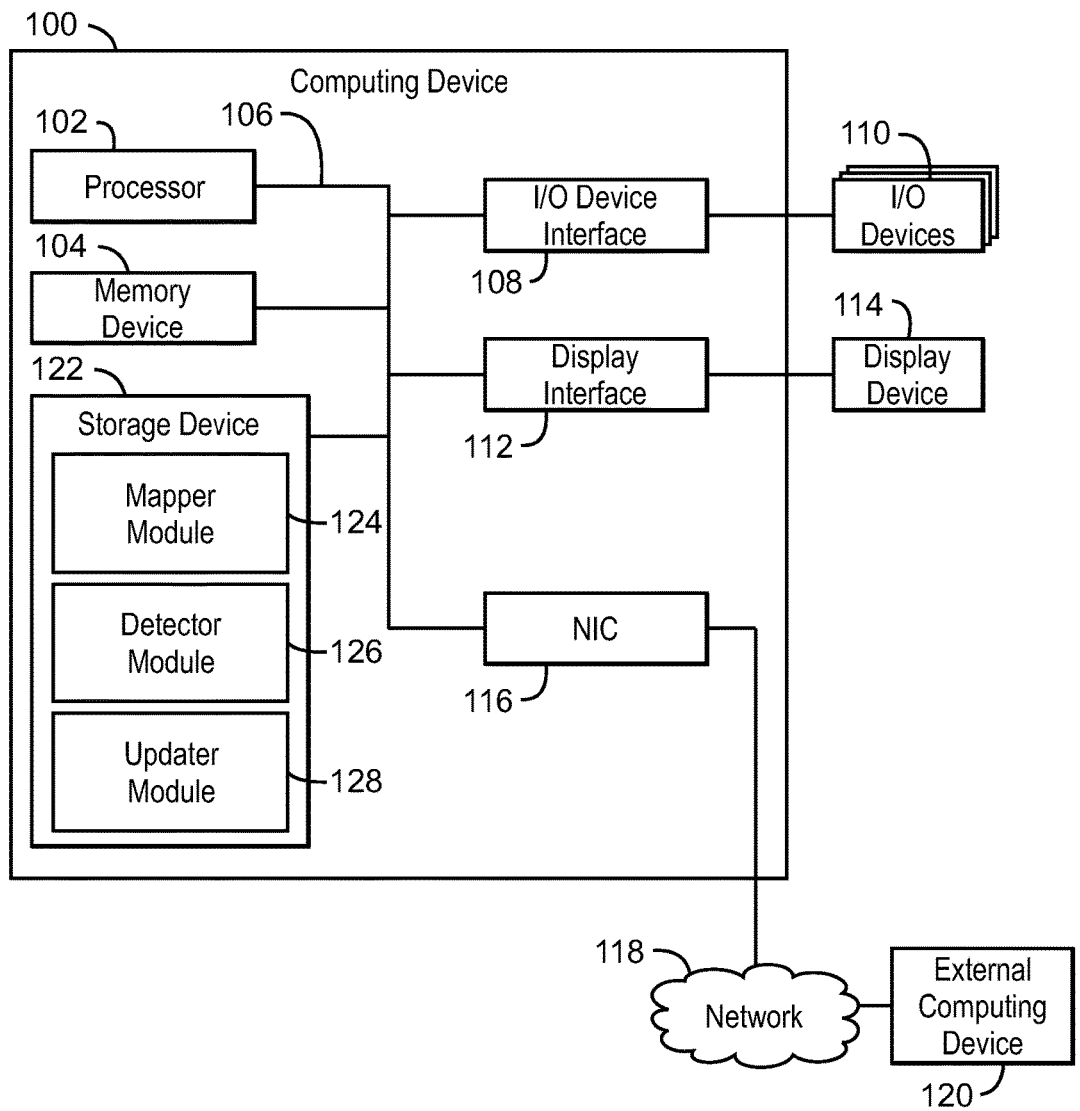
FIG. 1 is block diagram of an example computing device that can update web files.

With reference now to FIG. 1, an example computing device can update web files. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a mapper module 124, a detector module 126, and an updater module 128. The mapper module 124 can detect and map content fragments of a legacy model file to one or more web files. For example, content fragments can include elements such as packages, classes, or operations of legacy model files as discussed in FIGS. 2-4 below. The detector module 124 can detect changes to one or more of the content fragments. For example, a Boolean function, among others, can be used to detect changes. In some examples, the detector module 126 can detect changes in the content fragments based on element timestamps. For example, the detector module 126 can parse legacy model files into content fragments containing one or more elements and compare element timestamps for legacy model files with timestamps of web files stored locally and/or remotely. In some examples, the detector module 126 can detect changes to a legacy model file based on hash values. For example, the detector module 126 can generate fragment hash values for content fragments and compare the fragment hash values with previous fragment hash values corresponding to the same content fragments. The updater module 128 can send one or more web files to a server based on the detected change to a legacy model file. In some examples, the server can add, delete, or modify one or more web files corresponding to a content fragment.

Still referring to FIG. 1, in some examples, the updater module 128 can send the web files in response to receiving an update request. In some examples, the updater module 128 can send the web files at configurable intervals. For example, the updater module 128 may send the web files once an hour, once a day at a particular time, or once a week on a particular day and time, among others.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the mapper module 124, detector module 126, and updater module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the mapper module 124, detector module 126, and updater module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
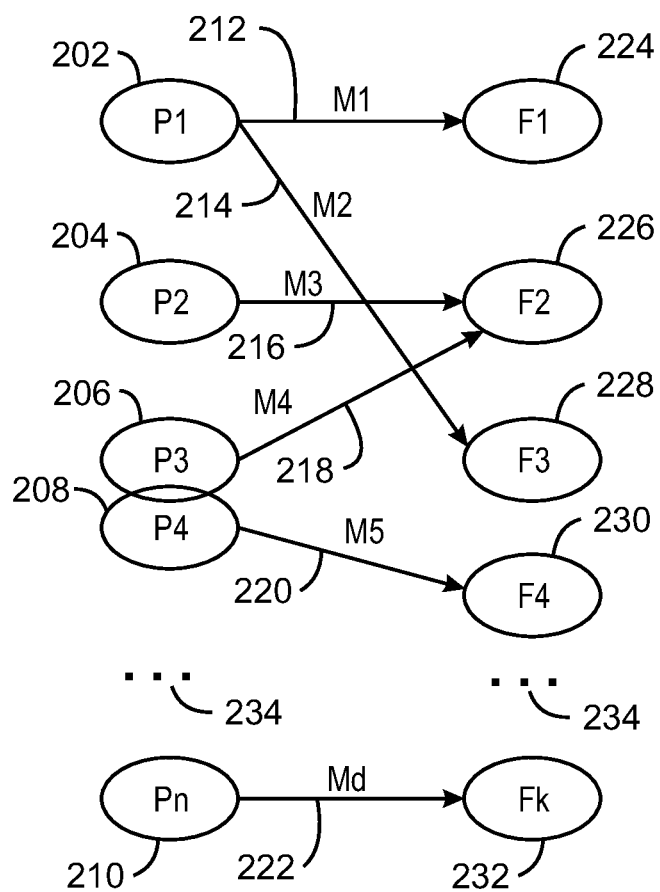
FIG. 2 is a block diagram of an example mapping of a legacy model file to web files.

FIG. 2 is a block diagram of an example mapping of a legacy model file to web files. The example mapping of FIG. 2 is generally referred to by the reference number 200.

In FIG. 2, a set of content fragments 202, 204, 206, 208, 210 of a legacy model file are mapped via mapping relations 212, 214, 216, 218, 220, 222 indicating potential modifications to web files 224, 226, 228, 230, and 232. The content fragment 202 is mapped via a mapping relation 212 to a web file 224 and via mapping relation 214 to a web file 228. The content fragment 204 is mapped via a mapping relation 216 to a web file 226. The content fragment 206 is mapped via a mapping relation 218 to web file 226. The content fragment 208 is mapped via a mapping relation 220 to a web file 230. The content fragment 210 is mapped via a mapping relation 222 to web file 232. Ellipses 234 indicate that one or more content fragments may be included between content fragment 208 and content fragment 210, and one or more additional web files may be included between web file 230 and web file 232.

In the example mapping 200 of FIG. 2, the relations 212, 214, 214, 216, 218, 220, and 222 indicate that if a content fragment is changed, then a corresponding web file in the relation may need to be updated. For example, the relations may not indicate that all of the data or information contained in a content fragment is mapped to one or more web files. Rather, some of the information of a content fragment may represent one or more elements of a model that are mapped to a web file and some of the information of the content fragment can be used for creation of the one or more web files corresponding to the one or more modified elements of the model. For example, the information can include a particular web format to use, among other information such as id or name of the model element, which may be used as the name of the web file. Furthermore, the content fragments can store consecutive lines of source code or, in some examples, content fragments can overlap and store multiple copies of any suitable number of lines of source code in a model legacy model file.

In FIG. 2, the content fragment 202 is mapped into two web files 224, and 228. Thus, an update to content fragment 202 can cause an update to web file 224, web file 228, or both. The content fragment 204 is mapped to web file 226. Moreover, content fragment 206 is also mapped to web file 226. Thus, a change to either content fragment 204 or content fragment 206 may cause an update to web file 226. Content fragment 206 is also shown overlapping a portion of content fragment 208. In some examples, a change in the overlapped portion of content fragments 206, 208 may cause an update to web file 226 or web file 230, or both web file 226 and web file 230.

Still referring to FIG. 2, additional content fragments such as content fragment 210 can be mapped to additional web files such as web file 232 as indicated by ellipses 234. In some examples, the mapping 200 can be used to translate detected changes of one or more of the content fragments as described in greater detail with reference to FIG. 5 below. For example, one or more modified content fragments of a legacy model file can be translated into one or more web files to be scheduled to be updated on a server. The web files can then be uploaded using less bandwidth than uploading entire legacy model files or all web files related to entire legacy model files.

In some examples, changes to one or more of the content fragments or web files can be detected using Boolean functions. For example, the detector module 126 can use Boolean functions to determine whether a timestamp or hash value has changed. For example, P1, ..., Pn can be content fragments of the legacy model files, F1, ..., Fk can be web files, M1, ..., Md are pairs contained in the mapping relation, and f1, ..., fd are Boolean functions. Moreover, S and D can be empty sets before detection begins. In some examples, for each i=1, ..., d the value of the Boolean function fi is calculated. Assuming that fi matches the pair (P, F), then Boolean function fi is calculated from the value of P and from data stored for P from a previous update. Furthermore, for each j=1, ..., k, if there is at least one i and one z such that Mi=(Pz, Fj) and Boolean function fi returns the value "TRUE," then j is added to the set S. In addition, for each j=1, ..., k, if all fragments mapped to web file Fj were deleted, then j is added to set D. Then, for each i in S, if a corresponding web file Fi was not created above then web file Fi is created. For each i in set S, Fi is then delivered from the client 100 to a server 120. In addition, for each i in set D, Fi is deleted from the server 120.

It is to be understood that the diagram of FIG. 2 is not intended to indicate that the mapping 200 is to include all of the components shown in FIG. 2. Rather, the mapping 200 can include fewer or additional components not illustrated in FIG. 2 (e.g., additional content fragments, or additional web files, etc.). In some examples, each content fragment can be mapped to one web file.

FIG. 3 is a block diagram of content fragments in an example model. The example model of FIG. 3 is generally referred to by the reference number 300 and is described with reference to FIG. 2 above.

In FIG. 3, the content fragments represent various elements of a model, such as packages, classes, and attributes. For example, a package 302 includes package 304 and package 306. A package as used herein, refers to a software construct used to group software elements. Package 304 includes a class 308. A class, as used herein, refers to an extensible program-code template for creating objects. Package 306 also includes a class 310. The class 308 includes an attribute 312 and an operation 314. An attribute as used herein, refers to a specification that defines a property of an object or class. An operation, as used herein, refers to code that can modify or set values of objects in a class, variables, and the like. The class 310 also includes an attribute 316 and an operation 318.

In implementations, different model elements can be represented by content fragments. For example, the model elements can include packages, classes, and operations, among others. Moreover, each content fragment can contain information about the model element that the content fragment represents. For example, the information can include the model element's identifier and name, among others. In FIG. 3, each package, 302, 304, and 306 can be represented as an individual content fragment of a legacy model file as described in FIG. 2. In addition, each class 308, 310 and each operation 314, 318 can be represented by a separate individual content fragment. In some examples, attributes can be represented by the same content fragment of the object or class that contains that attribute. For example, attribute 312 can be represented by the same content fragment that represents class 308 and attribute 310 can be represented by the same content fragment that represents class 310. Thus, for example, attribute 312 and class 308 can be represented by content fragment 202 of FIG. 2. When attribute 312 of class 308 changes, the web file 224 may be updated. Likewise, if class 308 is modified some other way, then web file 228 associated with the modification may be updated to reflect this change. In some embodiments, as discussed in greater detail below, web files can be updated after any suitable period of time. For example, a legacy model file can be modified on a local computing device and web files corresponding to specific modified model elements of the legacy model file can be updated at a later time when a connection is established between the local computing device and the remote computing device storing the web files.

It is to be understood that the diagram of FIG. 3 is not intended to indicate that the mapping 300 is to include all of the components shown in FIG. 3. Rather, the mapping 300 can include fewer or additional components not illustrated in FIG. 3 (e.g., additional packages, or additional classes, additional operations, etc.).

FIG. 4 is a diagram of an example legacy model file code for a model. The example code of FIG. 4 is generally referred to by the reference number 400.

In FIG. 4, a boxed code segment 402 representing a package overlaps with a code segment 404 representing another package. The code segment 404 also overlaps with a code segment 406 representing a class within the package of code segment 404. The code segment 406 further overlaps with code segment 408 representing an operation of the class of code segment 406. A code segment 410 representing attribute of the class of code segment 406 does not have any overlap with any other code segment. A code segment 412 is also representative of a package towards the bottom of FIG. 4.

Still referring to FIG. 4, code segment 402 and code segment 412 may be associated with a package and a content fragment. In some examples, when a change is detected to code segment 402 or code segment 412, one or more web files may be scheduled to be updated on a server. For example, if code segment 402 includes a modification detected via any of the methods of FIGS. 8-10 discussed below, then the corresponding web file can be scheduled to be updated at a particular time in the future.

Figure 8:
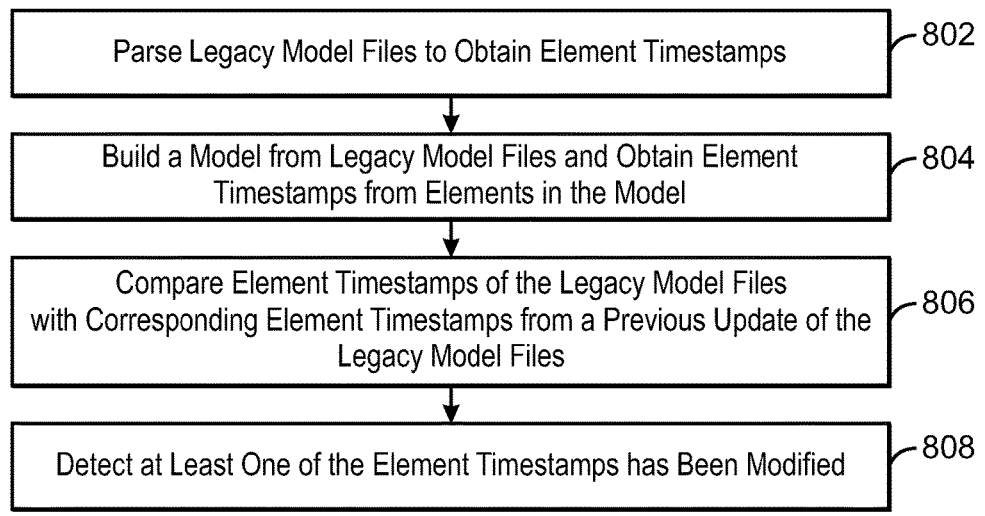
FIG. 8 is a process flow diagram of an example method that can detect changes to a legacy model file via element timestamps.
Figure 9:
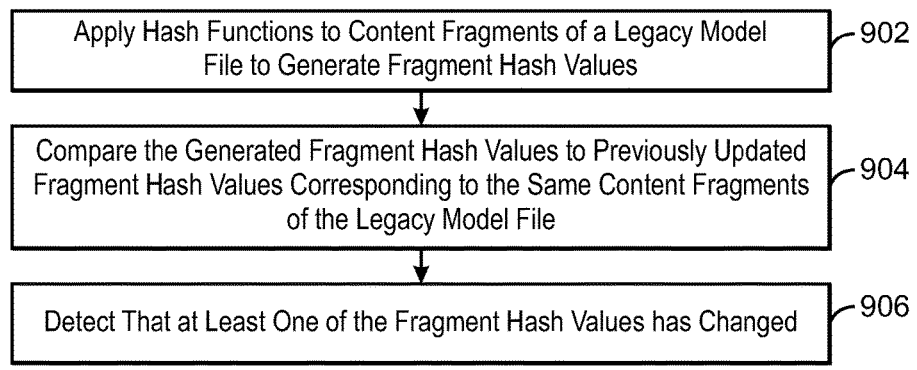
FIG. 9 is a process flow diagram of an example method that can detect changes to a legacy model file via fragment hash values.
Figure 10:
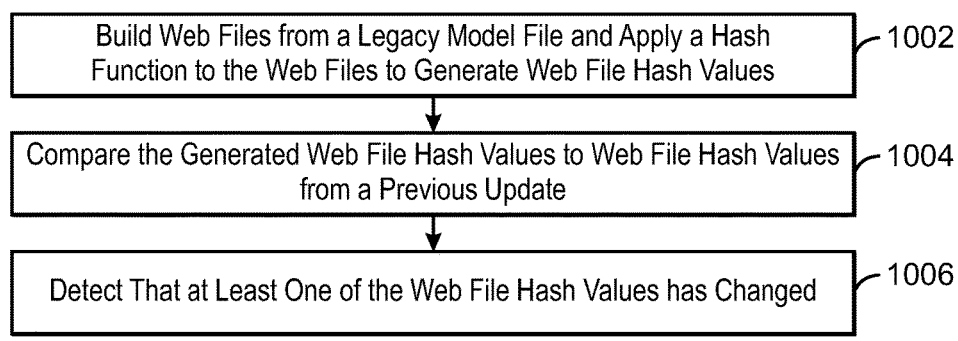
FIG. 10 is a process flow diagram of an example method that can detect changes to a legacy model file via web file hash values.

Still referring to FIG. 4, in some cases code segments can overlap and correspond to a plurality of web file updates. For example, the id variable of code segment 404 is contained in the code segment 402. Therefore, when code segment 404 is modified, the code segment 402 may be modified as well. For example, code segment 404 may be deleted. Since code segment 402 includes the id of code segment 404, a change will be detected to code segment 402 in addition to the detected deletion of code segment 404. Thus, a plurality of web files can be scheduled to be updated after either code segment 402 or code segment 404 is detected as changed by any of the methods discussed in FIGS. 8-10. FIGS. 8-10 generally describe the use of element timestamps and/or hash values to detect modifications to a legacy model file.

In some examples, content fragments may not be representative of consecutive lines of program code. For example, code segment 406 representing a class and code segment 410 representing an attribute of the class can be associated with a single content fragment. In some examples, one or more web files may be scheduled to be updated when the content fragment representing code segment 406 and code segment 410 is detected as having been modified. For example, a user using modeling tool software may have resulted in a modification to either code segment 406 or code segment 408.

It is to be understood that the diagram of FIG. 4 is not intended to indicate that the mapping 400 is to include all of the components shown in FIG. 4. Rather, the mapping 400 can include fewer or additional components not illustrated in FIG. 4 (e.g., additional packages, additional classes, or additional operations, etc.).

Figure 5:
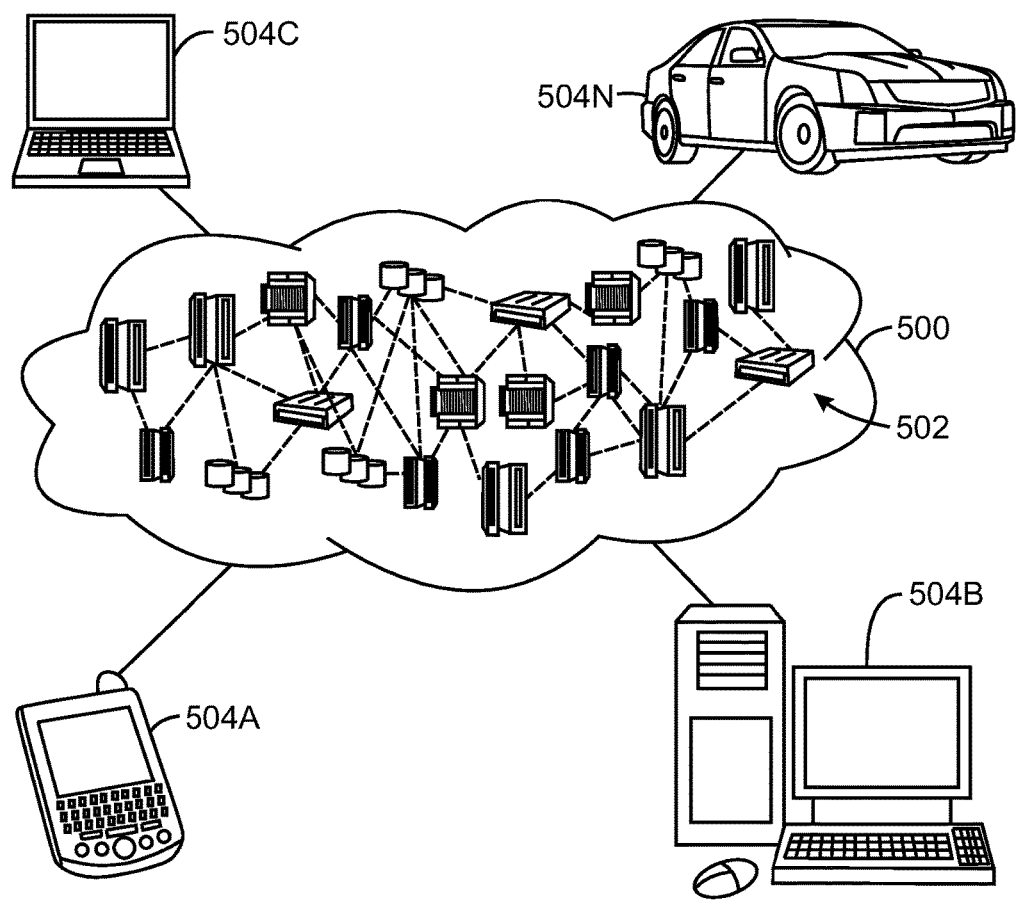
FIG. 5 is an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
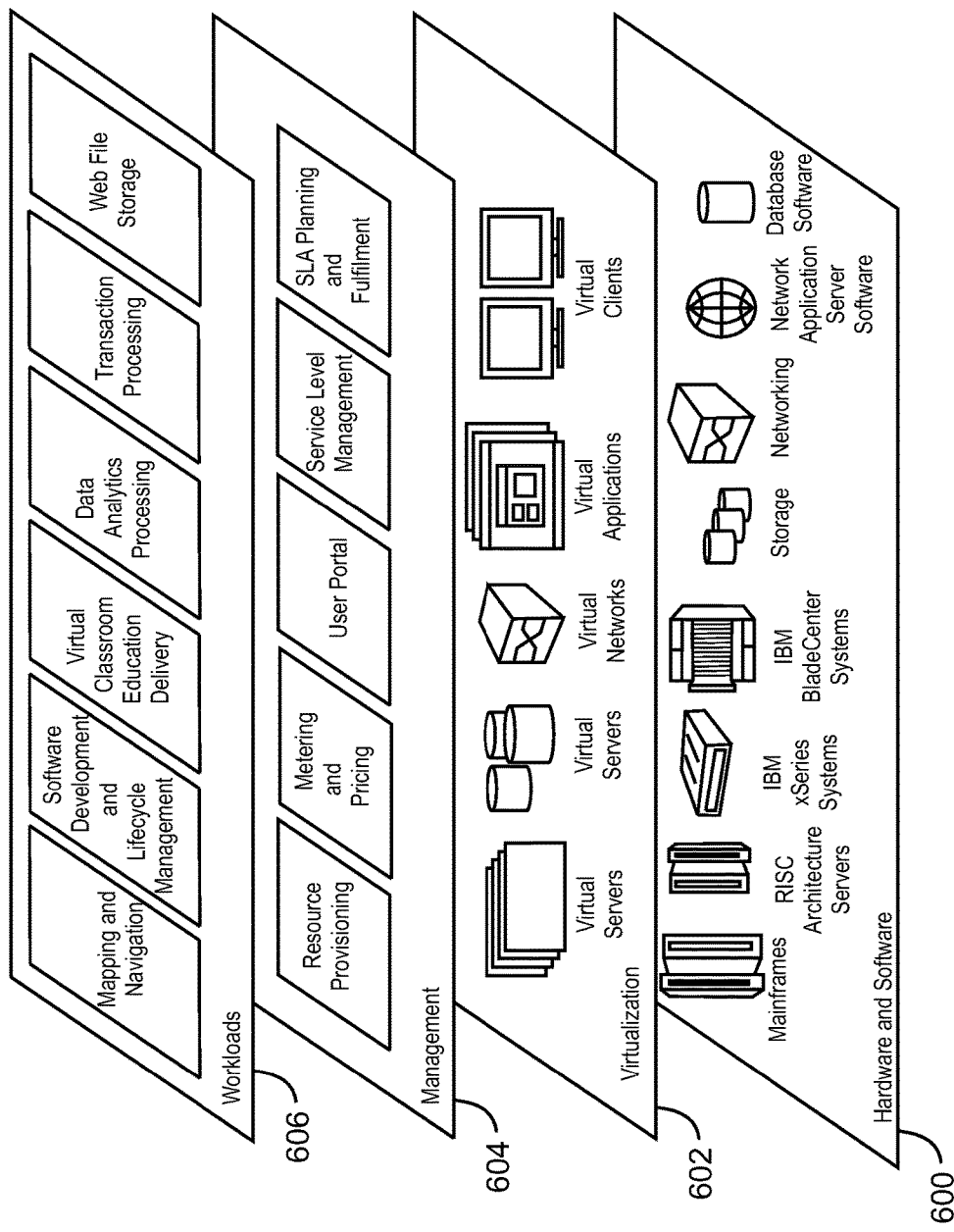
FIG. 6 is an example of abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and web file storage.

Figure 7:
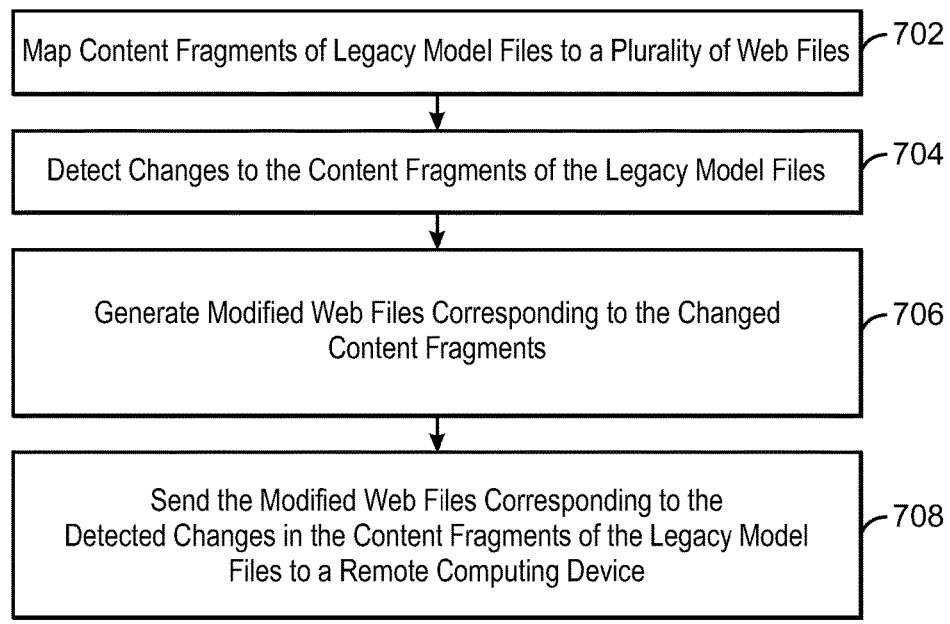
FIG. 7 is a process flow diagram of an example method that can update web files.

FIG. 7 is a process flow diagram of an example method that can update web files. The method 700 can be implemented with any suitable computing device, such as the computing device 100 of FIG. 1 and is described with reference to the example mapping 200 of FIG. 2.

At block 702, the mapper module 124 maps content fragments of a legacy model files to a plurality of web files. For example, content fragment 202 may be mapped to web file 224 and web file 228. In some embodiments, the mapper module 124 can generate a data structure (also referred to herein as a map) that can indicate a relationship between content fragments in legacy model files and web files. In some examples, the map is generated based on what the web files will contain. For example, the map can indicate if content fragments in legacy model files have a one to one relationship with corresponding web files, if content fragments in legacy model files have a one to many relationship with corresponding web files, or if content fragments in legacy model files do not have a relationship with web files. In some examples, content fragments in legacy model files that have recently been added may not correspond to a web file. In some embodiments, a relationship between a content fragment and a web file can be detected each time a web file is updated based on recent changes to legacy model files as discussed in greater detail below in relation to block 708.

At block 704, the detector module 126 detects changes to the content fragments of the legacy model files. For example, the detector module 126 may identify content fragments and compare element timestamps and/or hash values for each content fragment to detect changes to the content fragments as discussed in detail with reference to FIGS. 8-10 below. For example, for each change in a content fragment, the new element timestamp is stored for example as an attribute of some object in memory. Then, when the model is saved, this new timestamp is stored in a legacy model file. When the request for upload is detected, timestamps for all elements are retrieved and compared to the timestamps of the same fragments from the previous upload.

At block 706, the updater module 128 generates modified web files corresponding to the changed content fragments. In some examples, the updater module 128 may generate web files corresponding to one or more changed content fragments. For example, the updater module 128 can use the map to detect which content fragments of the legacy model file to include in each web file and then convert the content fragments from a legacy model file format into a web file format. Thus, web files corresponding to changed content fragments of the legacy model files are updated, while web files not corresponding to changed content may not be updated, which can save bandwidth and resources of computing device 100 and server 120.

At block 708, the updater module 128 sends the modified web files corresponding to the detected changes in the content fragments of the legacy model files to a remote computing device. For example, the remote computing device can be a server, among others. In some examples, the server can update the corresponding web files on the server by replacing the previous web file corresponding to a content fragment with a received modified web file, adding the received web files if no corresponding web file exists, or deleting web files. In some embodiments, the web files can be updated at a scheduled time.

The process flow diagram of FIG. 7 is not intended to indicate that the operations of the method 700 are to be executed in any particular order, or that all of the operations of the method 700 are to be included in every case. For example, the blocks of 702-708 may be executed in response to an upload request at a predetermined time or upon a user request. Additionally, the method 700 can include any suitable number of additional operations.

FIG. 8 is a process flow diagram of an example method that can detect changes to a legacy model file via element timestamps. The method 800 can be implemented with any suitable computing device, such as the computing device 100 of FIG. 1 and is described with reference to the example mapping 200 of FIG. 2. For the purpose of method 800, it is assumed that each model element is mapped to a single content fragment 210, and each content fragment 210 is mapped to a corresponding web file 232.

At block 802, the detector module 126 parses legacy model files to obtain element timestamps. For example, each model file can be split up into content fragments and the last modification time for each content fragment can be detected from timestamps in the elements forming a content fragment. In some examples, the detector module 126 may monitor elements of a model separately for changes in their corresponding element timestamps. In some examples, the element timestamps can be stored in the legacy model files corresponding to the model elements locally.

At block 804, the detector module 126 builds a model from legacy model files and obtains element timestamps from elements in the model. In some examples, instead of parsing legacy model files as in block 802, a model can be built from the legacy model files at a client computing device 100. For example, when a user wants to work with a model on a local device, the user may "open" the model in a modeling tool. This "opening" of the model includes reading of the legacy model files of the model and creating software model objects according to the read data. In some examples, the same process can be used to obtain timestamps of elements. The software model objects are created from legacy files. Since legacy files contain a timestamp for each element, these timestamps are represented by an attribute of an object representing each element. The element timestamp is obtained by reading of a value of such attribute from memory.

At block 806, the detector module 126 compares element timestamps of the legacy model files with element timestamps from a previous copy or update of the legacy model files. In some examples, the comparison can be made just before a scheduled update of web files to a server. For example, a Boolean function can be used to compare two timestamps of an element and return a value indicating the element timestamps are different.

At block 808, the detector module 126 detects at least one of the element timestamps has been modified. When a value is returned that indicates a timestamp has been modified, the detector module 126 can generate web files accordingly and send a notification to the updater module 128 that one or more web files corresponding to the modified element is to be updated. The corresponding web files may be created as discussed in FIG. 7 above. In addition, the new element timestamps for all the elements can be stored for use in the next scheduled update.

The process flow diagram of FIG. 8 is not intended to indicate that the operations of the method 800 are to be executed in any particular order, or that all of the operations of the method 800 are to be included in every case. For example, either block 802 or 804 may be used to obtain element timestamps. Additionally, the method 800 can include any suitable number of additional operations.

FIG. 9 is a process flow diagram of an example method that can detect changes to a legacy model file via fragment hash values. The method 900 can be implemented with any suitable computing device, such as the computing device 100 of FIG. 1 and is described with reference to the example mapping 200 of FIG. 2.

At block 902, the detector module 126 applies hash functions to content fragments of a legacy model file to generate fragment hash values. In some examples, content fragments are extracted from the legacy model files. A hash value is then calculated for each content fragment. For example, hash values can be calculated using any suitable type of hash function.

At block 904, the detector module 126 compares the generated fragment hash values to previously updated fragment hash values corresponding to the same content fragments of the legacy model file. If the previous uploaded fragment hash value and the generated fragment hash value are different for a content fragment P, then P has changed. In some examples, the hash values resulting from a hash function being applied to content fragments at two separate times are compared. For example, the Boolean functions associated with the corresponding pairs of hash values can return values indicating a difference if the two hash values are different.

At block 906, the detector module 126 detects that at least one of the fragment hash values has changed. For example, one or more Boolean functions may have returned a value indicating a fragment hash value has changed. Given the set F as the set of web files related to content fragment P, then web files in set F will be created in computing device 100 and uploaded to server 120. In some examples, the generated fragment hash values for all the fragments are stored for use in the next scheduled update.

The process flow diagram of FIG. 9 is not intended to indicate that the operations of the 900 are to be executed in any particular order, or that all of the operations of the method 900 are to be included in every case. Additionally, the method 900 can include any suitable number of additional operations.

FIG. 10 is a process flow diagram of an example method that can detect changes to a legacy model file via web file hash values. The method 1000 can be implemented with any suitable computing device, such as the computing device 100 of FIG. 1 and is described with reference to the example mapping 200 of FIG. 2.

At block 1002, the detector module 126 builds web files from a legacy model file and applies a hash function to the web files to generate web file hash values. For example, the detector module 126 may build the web files from content fragments upon the request of a scheduled update. The detector module can build web files using a map to detect content fragments to include and converting the content fragments from a legacy model file format into a web file format. In some examples, a web file hash value is calculated for each web file. For example, any suitable form of hash function can be used to generate the web file hash values.

At block 1004, the detector module 126 compares the generated web file hash values to previously uploaded web file hash values corresponding to the same web files. If the previous and newly generated web file hash values are different for a web file, then the web file has changed.

At block 1006, the detector module 126 detects that at least one of the web file hash values has changed. For example, one or more Boolean functions can be used to detect a change in a web file hash value. In some examples, web files corresponding to hash values that have been detected as changed are sent to the server. In some examples, the generated web file hash values are stored locally and/or remotely to use in future updates.

The process flow diagram of FIG. 10 is not intended to indicate that the operations of the method 1000 are to be executed in any particular order, or that all of the operations of the method 1000 are to be included in every case. Additionally, the method 1000 can include any suitable number of additional operations.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
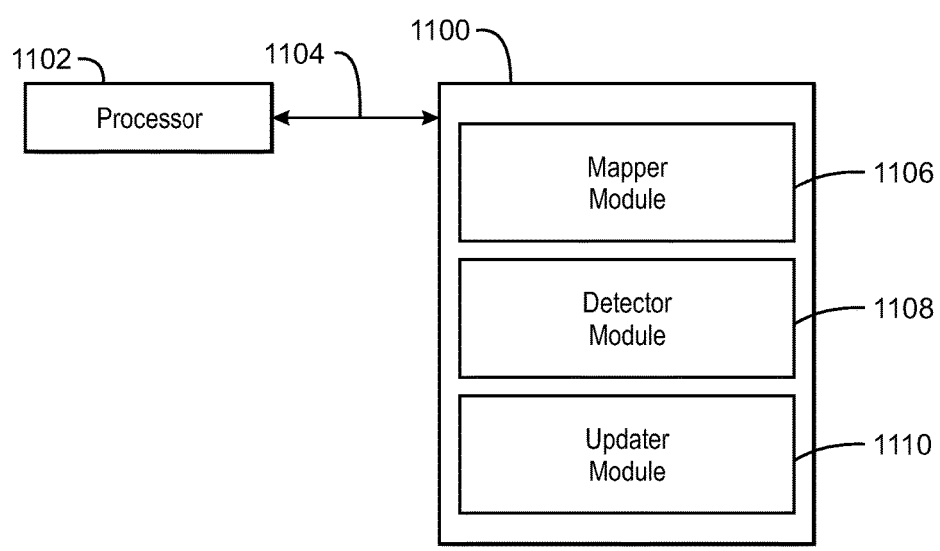
FIG. 11 is an example tangible, non-transitory computer-readable medium that can update web files.

Referring now to FIG. 11, a block diagram is depicted of an example tangible, non-transitory computer-readable medium 1100 that can update web files corresponding to content fragments of legacy model files. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the current method.

The various software components discussed herein may be stored on the tangible, non-transitory, computer-readable medium 1100, as indicated in FIG. 11. For example, a mapper module 1106 includes code to map content fragments of a legacy model file to a plurality of web files. A detector module 1108 includes code to detect a change to a content fragment of the legacy model file. An updater module 1110 includes code to generate a modified web file corresponding to the changed content fragment. The updater module 1110 also includes code to send, via the processor, the modified web file to a server along with a timestamp and/or hash value associated with the web file at a predetermined time.

In some examples, the detector module 1108 can include code executable by the processor to compare an element timestamp of a legacy model file with an element timestamp of a legacy model file corresponding to a previously uploaded web file. In some examples, the detector module 1108 can include code to build a model from the legacy model file and obtain element timestamps from the model. In some examples, the detector module 1108 can include code to build a web file and apply a hash function to the web file and compare the web file hash value with a previous hash value corresponding to the same web file. In some examples, the detector module 1108 can include code to apply a hash function the content fragment of the legacy model file and compare the fragment hash value with a previous fragment hash value corresponding to the same content fragment. In some examples, the web file can be updated on the server by adding, replacing, or deleting the corresponding web file remotely.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 11 may be included within the tangible, non-transitory, computer-readable medium 1100, depending on the specific application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   dividing, via a processor, a legacy model file into content fragments, wherein the legacy model file is stored on a computer system, wherein the legacy model file is one of a plurality of legacy model files to be parsed into content fragments;
   mapping, via the processor, each of the content fragments of the legacy model file to web files, wherein the mapping includes a correspondence between one of the content fragments to multiple web files;
   detecting, via the processor, a change to the one or more content fragments of the legacy model file by building a model from the legacy model file, obtaining an element timestamp from an element in the model, comparing the element timestamp of the legacy model file with a corresponding element timestamp from a previous update of the legacy model file, and detecting at least one of the element timestamps has been modified;
   generating, via the processor, one or more modified web files corresponding to the changed content fragment by converting the changed content fragment from a legacy file format into a web file format, wherein the one or more modified web files only relate to the changed content fragments of the legacy model file; and
   sending, via the processor, only the one or more modified web files corresponding to the detected changes in the content fragment of the legacy model file to a remote computing device based on determining that a connection has been established between the computer system and the server, wherein the detecting is performed by the processor before a scheduled update to the server.

2. The method of claim 1, wherein detecting the change to the content fragment of the legacy model file comprises:
   parsing the legacy model file to obtain element timestamps;
   comparing an element timestamp of the legacy model file with a corresponding element timestamp from a previous update of the legacy model file; and
   detecting at least one of the element timestamps has been modified.

3. The method of claim 1, wherein detecting the change to the content fragment of the legacy model file comprises:
   applying a hash function to the content fragment of the legacy model file to generate a fragment hash value;
   comparing the generated fragment hash value to a previously updated fragment hash value corresponding to the same content fragment of the legacy model file; and
   detecting that the fragment hash value has changed.

4. The method of claim 1, wherein detecting the change to the content fragment of the legacy model file comprises:
   building web files from a legacy model file and applying a hash function to the web files to generate web file hash values;
   comparing the generated web file hash values to web file hash values from a previous update; and
   detecting that a web file hash value has changed.

5. The method of claim 1, wherein updating the web file comprises adding, replacing, or deleting the web file.

* * * * *